US006933345B1

(12) United States Patent
Lichtenhan et al.

(10) Patent No.: US 6,933,345 B1
(45) Date of Patent: Aug. 23, 2005

(54) REACTIVE GRAFTING AND COMPATIBILIZATION OF POLYHEDRAL OLIGOMERIC SILSESQUIOXANES

(75) Inventors: Joseph D. Lichtenhan, San Juan Capistrano, CA (US); Frank J. Feher, Costa Mesa, CA (US); Joseph J. Schwab, Huntington Beach, CA (US); Sixun Zheng, Shanghai (CN)

(73) Assignee: Hybrid Plastics, LLP, Fountain Valley, CA (US)

( * ) Notice: Subject to any disclaimer, the term of this patent is extended or adjusted under 35 U.S.C. 154(b) by 0 days.

(21) Appl. No.: 10/351,292

(22) Filed: Jan. 23, 2003

Related U.S. Application Data

(63) Continuation-in-part of application No. 09/818,265, filed on Mar. 26, 2001, now Pat. No. 6,716,919.
(60) Provisional application No. 60/351,523, filed on Jan. 23, 2002, and provisional application No. 60/192,083, filed on Mar. 24, 2000.

(51) Int. Cl.$^7$ .............................................. C08L 83/00
(52) U.S. Cl. ....................... 525/101; 525/106; 525/431; 525/446; 525/464; 525/484
(58) Field of Search ................................ 525/101, 106, 525/431, 446, 464, 484

(56) References Cited

U.S. PATENT DOCUMENTS

| | | | |
|---|---|---|---|
| 2,801,968 A | 8/1957 | Furby et al. ................ | 252/32.5 |
| 3,231,499 A | 1/1966 | Smith ........................... | 252/57 |
| 3,247,111 A | 4/1966 | Oberright et al. ........... | 252/34.7 |
| 3,267,031 A | 8/1966 | Brennan et al. ............. | 252/49.8 |
| 3,278,436 A | 10/1966 | Dazzi et al. .................. | 252/50 |
| 3,280,031 A | 10/1966 | Fritz ............................ | 252/18 |
| 3,293,180 A | 12/1966 | Axworthy ..................... | 252/28 |
| 3,340,286 A | 9/1967 | Schiefer et al. ........... | 260/448.2 |
| 3,347,791 A | 10/1967 | Thomson et al. ........... | 252/33.6 |
| 3,673,226 A | 6/1972 | Malec ....................... | 260/410.6 |
| 5,412,053 A | 5/1995 | Lichtenhan et al. ........... | 528/9 |
| 5,484,867 A | 1/1996 | Lichtenhan et al. ........... | 528/9 |
| 5,589,562 A | 12/1996 | Lichtenhan et al. ........... | 528/9 |
| 5,858,544 A | 1/1999 | Banaszak Holl et al. ... | 428/447 |
| 5,939,576 A | 8/1999 | Lichtenhan et al. ........ | 556/460 |
| 5,942,638 A | 8/1999 | Lichtenhan et al. ........ | 556/640 |
| 6,075,068 A | 6/2000 | Bissinger .................... | 523/116 |
| 6,100,417 A | 8/2000 | Lichtenhan et al. ........ | 556/460 |
| 6,228,904 B1 | 5/2001 | Yadav et al. ................. | 523/210 |
| 6,252,030 B1 | 6/2001 | Zanket et al. ................. | 528/31 |
| 6,245,849 B1 | 6/2003 | Morales et al. ............. | 524/442 |

*Primary Examiner*—Bernard Lipman
(74) *Attorney, Agent, or Firm*—David Jaffer; Pillsbury Winthrop LLP

(57) ABSTRACT

The nanoscopic dimensions of polyhedral oligomeric silsesquioxanes (POSS) and polyhedral oligomeric silicates (POS) materials ranges from 0.7 nm to 5.0 nm and enables the thermomechanical and physical properties of polymeric materials to be improved by providing nanoscopic reinforcement of polymer chains at a length scale that is not possible by physically smaller aromatic chemical systems or larger fillers and fibers. A simple and cost effective method for incorporating POSS/POS nanoreinforcements onto polymers via the reactive grafting of suitably functionalized POSS/POS entities with polymeric systems amenable to such processes is described. The method teaches that the resulting POSS-grafted-polymers are particularly well suited for alloying agents by nongrafted POSS entitles such as molecular silicas. The successful alloying of POSS-polymers is aided because their interfacial tensions are reduced relative to non-POSS containing systems.

5 Claims, 2 Drawing Sheets

REACTIVE GRAFTING AND COMPATIBILIZATION OF POLYHEDRAL OLIGOMERIC SILSESQUIOXANES

RELATED APPLICATIONS

This application claims priority from U.S. provisional application Ser. No. 60/351,523 filed Jan. 23, 2002, and is a continuation-in-part of U.S. application Ser. No. 09/818,265 filed Mar. 26, 2001 now U.S. Pat. No. 6,716,919, which claims priority from U.S. provisional application Ser. No. 60/192,083 filed Mar. 24, 2000. The disclosures of each of these applications are incorporated herein by reference.

FIELD OF THE INVENTION

The present invention relates generally to methods for enhancing the properties of a polymer and, more particularly, to methods for attaching polyhedral oligomeric silsesquioxanes and polyhedral oligomeric silicate to polymers.

BACKGROUND OF THE INVENTION

There is a continuing need for polymeric materials with physical characteristics that exceed the properties of traditional systems. The search for such improvements in the 1950's led to the incorporation of bulky aromatic groups into polymer back-bones and thereby reducing chain motion which in turn resulted in significant improvements in strength and thermal stability relative to aliphatic systems. (See *The Development of Plastics*, Editors S. T. I. Mossman and P. J. T Morris, Royal Soc. Chem. 1994, Cambridge.) More recent advancements in the 1970's through 1980's focused on the incorporation of inorganic fillers into polymers via blending to impart some of the desirable physical characteristics of the inorganic filler to the polymer. This effort has included the blending of micron-sized particulates to particulates that are nanoscopic in one-dimension. All of these have attained only incremental improvements in physical properties. (See George Wypnch, *Fillers*, Chem Tec Publishing Ontario, Canada, 1993; B. K. G. Theng, *Developments in Soil Science, Vol 9: Formation and Properties of Clay-Polymer Complexes*, 1979; E. P. Giannelis, R. Krishnamoorti, and E. Manias, *Adv. Polym. Sci.*, 138, 107, 1999.) Nanocomposite polymers formed by the incorporation of reinforcements that are truly nanoscopic in all three dimensions and which are capable of complete molecular level dispersion have also been reported.

Polyhedral oligomeric silsesquioxane ("POSS") dimers, cage molecules, polymers and resins as well as polyhedral oligomeric silicate ("POS") (spherosilicate) cage molecules, polymers and resins are increasingly being utilized as building blocks for the preparation of performance polymeric materials. Their nanometer size and unique hybrid (inorganic-organic) chemical composition are responsible for the many desirable property enhancements that have been observed upon incorporation of POSS/POS reagents into polymer systems. For example, U.S. Pat. No. 5,858,544 to Holl et. al. discloses methods of using nanoscopic POSS building blocks to modify the surfaces of metals to improve their corrosion resistance. Similarly, U.S. Pat. Nos. 5,412,053 and 5,484,867 to Lichtenhan et. al., the contents of which are incorporated herein by reference, and U.S. Pat. No. 6,252,030 to Zank et. al., discuss the polymerization of POS/POSS entities. The prior art, however, does not afford the nanoscale reinforcement of polymer chains or of polymer morphologies via the method of reactive grafting POS/POSS entities directly onto polymers, nor does the prior art describe the use of grafted POS/POSS and their corresponding copolymers as compatibilizing agents for non-grafted or nongraftable POSS entities. In addition, there is a need for a method to incorporate POS/POSS segments into polymers for the purposes of reducing interfacial tensions to control polymer microstructure, nanostructure and interfacial compatibility.

SUMMARY OF THE INVENTION

The present invention teaches the use of Nanostructured™ POSS chemicals as graftable agents for the rapid and low cost modification of thermoplastic and thermoset polymers. This invention also teaches the use of the resulting POSS-copolymers as compatibilization aids for use in compounding, blending and alloying of polymers with non-reactive POSS reinforcements, and other nanoscopic particulates. Finally, this invention teaches the use of POSS-modification (via reactive compounding or blending) for the purpose of exerting additional control over polymer morphology. The precisely defined nanoscopic features provided by the POSS agents compatibilize and provide multi-length scale levels of reinforcement in polymers and the interfacial regions of polymers.

Definition of Formula Representations for Nanostructures

Nanostructured™ Chemicals are defined by the following features. They are single molecules and not compositionally fluxional assemblies of molecules. They possess polyhedral geometries with well-defined three-dimensional shapes. Clusters are good examples whereas planar hydrocarbons, dendrimers and particulates are not. They have a nanoscopic size that ranges from approximately 0.7 nm to approximately 5.0 nm. Hence, they are larger than small molecules but smaller than macromolecules. They have systematic chemistries that enable control over stereochemistry, reactivity and their physical properties.

For the purposes of understanding this invention's Nanostructured™ chemical compositions, the following definition for formula representations of Polyhedral Oligomeric Silsesquioxane (POSS) and Polyhedral Oligomeric Silicate (POS) nanostructures is made:

[$(RSiO_{1.5})_n(R'SiO_{1.5})_m$]$_{\Sigma\#}$ for heteroleptic compositions (where R≠ R');

[$(RSiO_{1.5})_n(RXSiO_{1.0})_m$]$_{\Sigma\#}$ for functionalized heteroleptic compositions (where the R groups can be equivalent or inequivalent);

[$(RSiO_{1.5})$]$_\infty$ for polymeric compositions;

[$(XSiO_{1.5})$]$_{\Sigma\#}$ for homoleptic silicate compositions.

In all of the above R is an organic substituent (H, siloxy, cyclic or linear aliphatic or aromatic groups that may additionally contain reactive functionalities such as alcohols, esters, amines, ketones, olefins, ethers or halides). X includes but is not limited to OH, Cl, Br, I, alkoxide (OR), acetate (OOCR), peroxide (OOR), amine ($NR_2$), isocyanate (NCO), and R. The symbols m and n refer to the stoichiometry of the composition. The symbol Σ indicates that the composition forms a nanostructure and the symbol # refers to the number of silicon atoms contained within the nanostructure. The value for # is usually the sum of m and n. It should be noted that Σ# is not to be confused as a multiplier for determining stoichiometry, as it merely describes the overall nanostructural characteristics of the system (i.e. cage size).

POSS Fragments are defined as structural subcomponents that can be assembled into POSS nanostructures and are represented by formula [$(RSiO_{1.5})_n(RXSiO_{1.0})_m$]. Note that the symbols Σ# are absent as these fragments are not polyhedral nanostructures.

Scheme 1 below illustrates some representative examples of silsesquioxane, silicate, POSS and POS nanostructures and fragments:

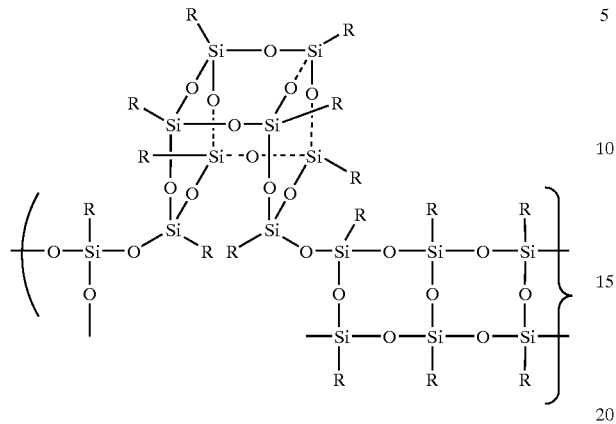

Example of Polysilsesquioxane Resins [RSiO$_{1.5}$]$_\infty$

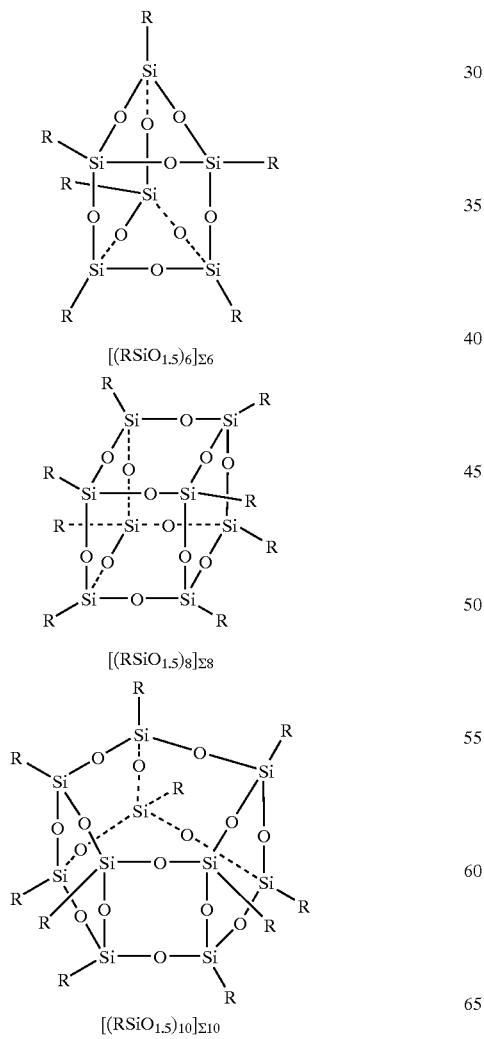

[(RSiO$_{1.5}$)$_6$]$_{\Sigma 6}$

[(RSiO$_{1.5}$)$_8$]$_{\Sigma 8}$

[(RSiO$_{1.5}$)$_{10}$]$_{\Sigma 10}$

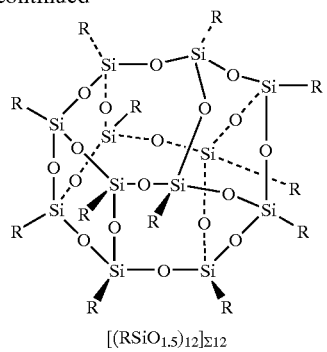

[(RSiO$_{1.5}$)$_{12}$]$_{\Sigma 12}$

Examples of Homoleptic POSS Systems
[(RSiO$_{1.5}$)]$_{\Sigma\#}$

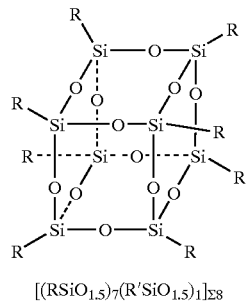

[(RSiO$_{1.5}$)$_7$(R'SiO$_{1.5}$)$_1$]$_{\Sigma 8}$

Example of a Heteroleptic POSS System [(RSiO$_{1.5}$)$_n$(R'SiO$_{1.5}$)$_m$]$_{\Sigma\#}$

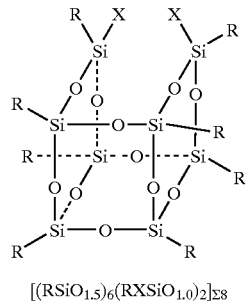

[(RSiO$_{1.5}$)$_6$(RXSiO$_{1.0}$)$_2$]$_{\Sigma 8}$

Example of a Functionalized Homoleptic POSS System [(RSiO$_{1.5}$)$_n$(RXSiO$_{1.0}$)$_m$]$_{\Sigma\#}$

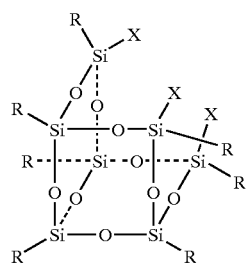

[(RSiO$_{1.5}$)$_3$(R'SiO$_{1.5}$)$_1$(RXSiO$_{1.0}$)$_3$]$_{\Sigma 7}$

Example of a Functionalized Heteroleptic POSS
System $[(RSiO_{1.5})_n(R'SiO_{1.5})_m(RXSiO_{1.0})_p]_{\Sigma\#}$

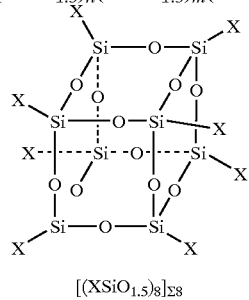

$[(XSiO_{1.5})_8]_{\Sigma 8}$

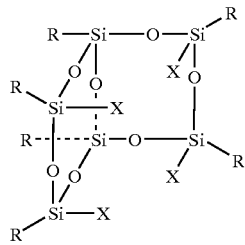

Fragment Examples:
$RSiX_3$ (1), $[(RXSiO_{0.5})_n]$ (2), $[(RXSiO_{1.0})_n]$ (3),
$[(RSiO_{1.5})_n(RXSiO_{1.0})_m]$ (4)

Example of a Polyhedral Oligomeric Silicate
System $[(XSiO_{1.5})_n]_{\Sigma\#}$
Scheme 1.
Examples of Common Silsesquioxane,
Silicate, POSS Nanostructures and Fragments.

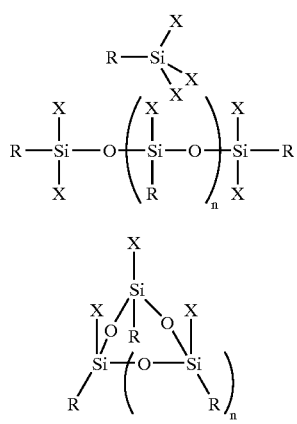

DETAILED DESCRIPTION OF THE INVENTION

Figure 1:
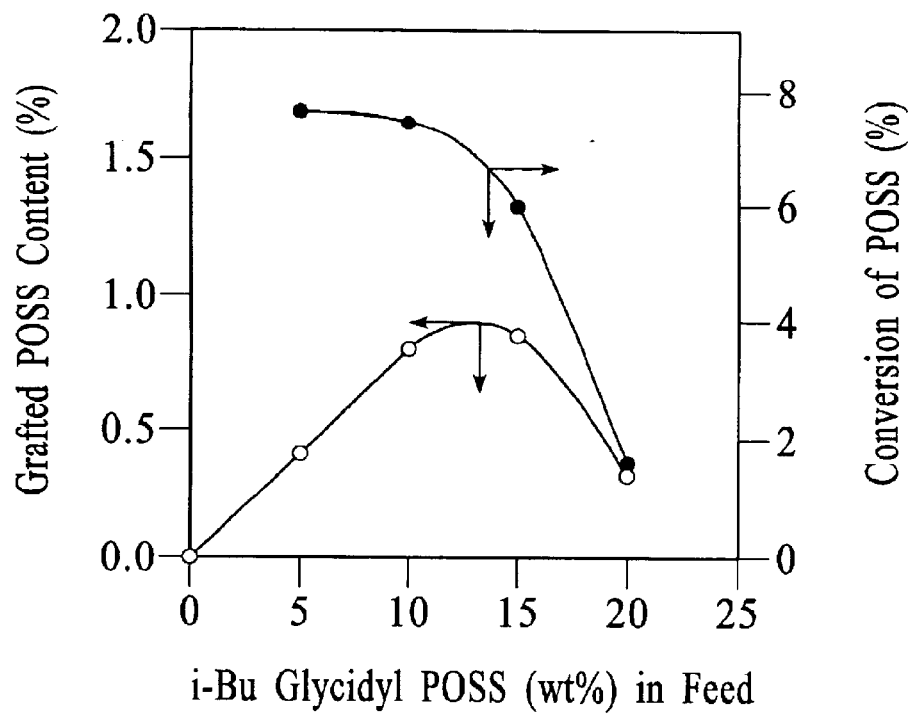
FIG. 1 shows the amount of POSS incorporated into the copolymer.

A structural representation for Nanostructured™ Chemicals based on the class of chemicals known as polyhedral oligomeric silsesquioxanes (POSS) is shown in Scheme 2:

Scheme 2.
The anatomy of a POSS™ Nanostructured Chemical.

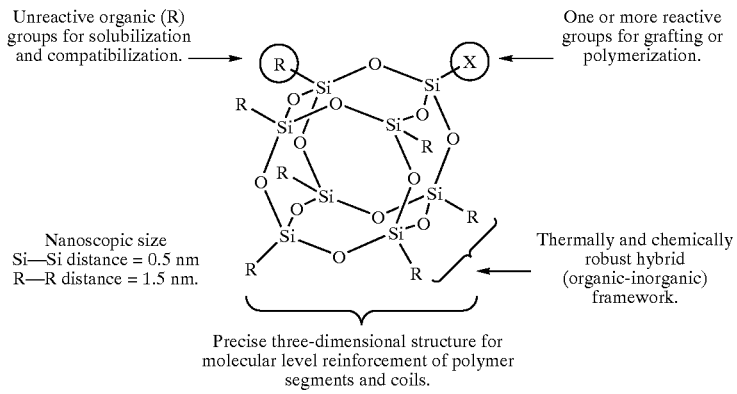

Unreactive organic (R) groups for solubilization and compatibilization.

One or more reactive groups for grafting or polymerization.

Nanoscopic size
Si—Si distance = 0.5 nm
R—R distance = 1.5 nm

Thermally and chemically robust hybrid (organic-inorganic) framework.

Precise three-dimensional structure for molecular level reinforcement of polymer segments and coils.

Their features include a unique hybrid (organic-inorganic) composition that possesses many of the desirable physical characteristics of both ceramics (thermal and oxidative stability) and polymers (processibility and toughness). In addition, they possess an inorganic skeleton which is externally covered by compatiblizing organic groups R and reactive groups X where R=organic substituent (H, siloxy, cyclic or linear aliphatic or aromatic groups that may additionally contain reactive functionalities such as alcohols, esters, amines, ketones, olefins, ethers or halides). X includes but is not limited to OH, Cl, Br, I, alkoxide (OR), acetate (OOCR), peroxide (OOR), amine ($NR_2$), isocyanate (NCO), olefin, and R. The inorganic skeleton coupled with the peripheral groups combine to form chemically precise, cage-like, low density nanoscopic materials that improve the physical properties of a wide range of materials. The design and synthesis of POSS/POS compounds with cage sizes and shapes along with R and RX have been described in the above-mentioned references.

In addition, the systematic variation of R and R-Y groups on the POSS/POS systems have been accomplished using the following methods: silation (U.S. Pat. No. 5,484,867 to Lichtenhan et al.), hydrosilation (U.S. Pat. No. 5,939,576 to Lichtenhan et al.), metathesis (U.S. Pat. No. 5,942,638 to Lichtenhan et al.), and group substitution (U.S. Pat. No. 6,100,417 to Lichtenhan et al.). The contents of the foregoing patents are expressly incorporated herein by reference.

As shown in Table 1, the size of POSS is roughly equivalent to that of most polymer dimensions. Thus, POSS can effectively introduce porosity into existing polymer morphologies at a molecular level.

TABLE 1

Relative sizes of POSS, polymer dimensions, and fillers.

| Particle Type | Particle Diameter |
|---|---|
| Amorphous Polymer Segments | 0.5 nm to 5 nm |
| Octacyclohexyl POSS | 1.5 nm |
| Random Polymer Coils | 5 nm to 10 nm |
| Colloidal Silica | 9 nm to 80 nm |
| Crystalline Lamellae | 1.0 nm to 9,000 nm |
| Fillers/Organoclays | 2 nm to 100,000 nm |

Representative formula for Nanostructured™ POSS/POS Chemicals that are desirable for incorporation into high performance polymers via nonreactive blending are the closed-cage homoleptic systems corresponding to the formula $[(RSiO_{1.5})]_{\Sigma\#}$ and $[(XSiO_{1.5})_n]_{\Sigma\#}$ and the open-cage formula corresponding to functionalized homoleptic POSS $[(RSiO_{1.5})_n(RXSiO_{1.0})_m]_{\Sigma\#}$ and functionalized heteroleptic POSS $[(RSiO_{1.5})_n(R'SiO_{1.5})_m(RXSiO_{1.0})_p]_{\Sigma\#}$ and POSS resins $[RSiO_{1.5}]\infty$.

Copending U.S. patent application Ser. No. 09/818,265 describes methods of incorporating POSS systems bearing nonreactive functionalities into polymer via compounding, blending and mixing. Using the same compounding process and but with POSS-monomers and POSS-reagents bearing reactive functionalities, POSS reinforcements can be incorporated into polymers through reactive grafting or through reactive polymerization. The preferred method of incorporation involves high shear mixing, although other alternatives such as solvent mixing, milling and blending may be used. The level of property enhancement is dependent upon loading level, the size/shape and distribution of the POSS nanostructures and upon processing conditions. The loading levels range from 0.1% to 99% with levels of 10–30% being preferred.

Representative open-cage formula for Nanostructured™ POSS/POS Chemicals that are desirable for incorporation into high performance polymers via reactive blending and reactive grafting include monofunctional systems, difunctional systems and polyfunctional formulations (Scheme 3):

Scheme 3.
Open-cage mono, di and polyfunctional reactive POSS systems.

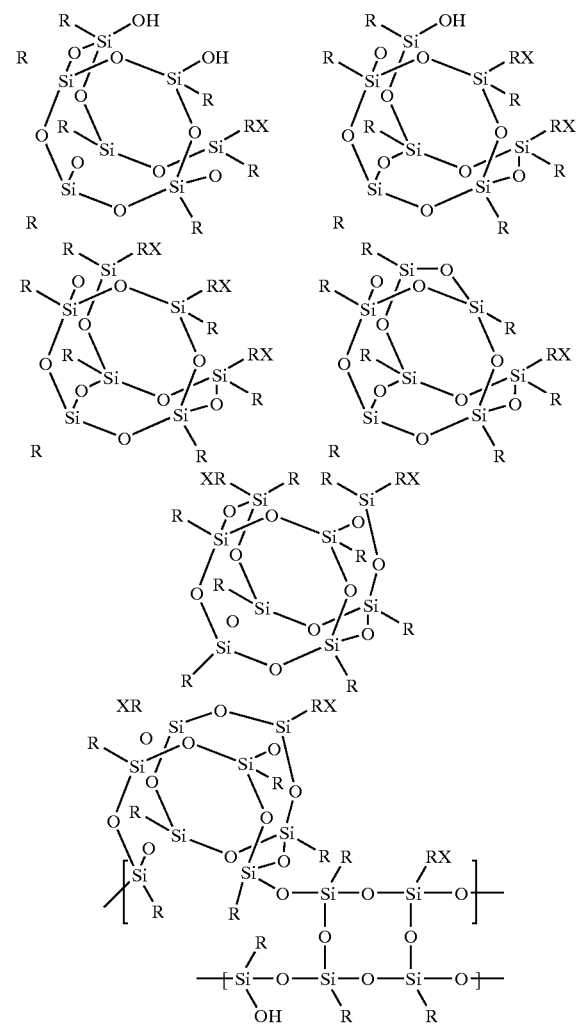

Sample closed-cage nanostructures are shown below in Scheme 4. While both open-cage and closed-cage nanostructures can be incorporated into identical formulations, the open-cage nanostructures are desirable for formulations that required additional ductility. While the closed-cages are more rigid, they also provide formulations with enhanced modulus relative to open-cage nanostructures. Open-cage formulations containing residual silanol groups also show enhanced adhesion.

Scheme 4.
Closed-cage mono, di and polyfunctional amines.

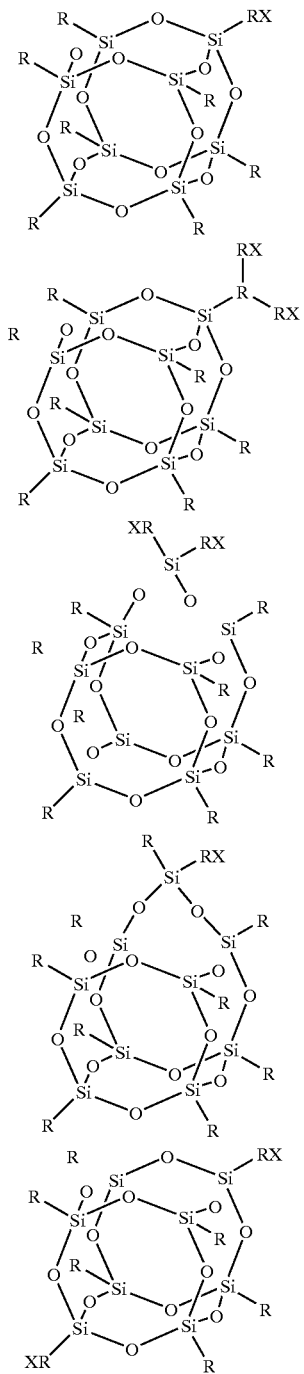

Mono-functional POSS-monomers are suitable for grafting onto thermoplastic polymers as pendant side-chain groups and as chain terminators in the same manner as a traditional monofunctional organic monomers. Monofunctional POSS-monomers are particularly useful for reinforcing thermoplastics resins and for providing additional reinforcement to thermoset systems. Difunctional POSS-monomers are designed for direct copolymerization into the backbone of polymers in the same manner as a traditional difunctional organic monomers. Difunctional POSS-monomers are particularly useful for incorporation into thermoplastics systems yet can also be used as crosslinkers. Polyfunctional POSS systems are similarly ideally suited as crosslinkers, and adhesion promoters for thermoset systems.

The functionalized POSS structures shown in Schemes 3 and 4 have direct utility in imides, epoxies, urethanes, urea, novolac, amide, ester, olefin, siloxane polymer systems. These structural formula can be modified with any reactive X groups which include but are not limited to olefin, silanol, silane, anhydride, epoxy, maleimide, oxazoline, cyanate esters, ester, acid, and alcohol, and halide functionalities that would render them desirable for use a graftable or polymerizable agents for polymers such as nylons, olefins, amides, polyurethanes, epoxies, cyanate esters, bismaleimides, polybenzoxizoles, polybenzimidizoles, polybenzthiozoles, polyesters, and phenolics.

Methods of Polymer Synthesis

Numerous preparative methods for grafting or reactively polymerizing POSS entities onto polymeric chains are possible. A method for the incorporation of POSS into silicones is shown in Scheme 5. This example involves the reaction of POSS-silanols with hydride containing siloxane polymer or vice versa. The process can also be accomplished via hydrosilation reactions between POSS-olefins with a hydride containing siloxane or vice versa.

Scheme 5

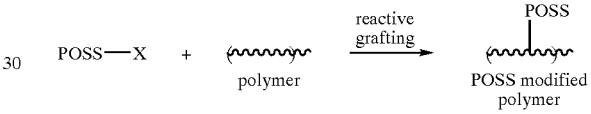

Note that this process is general and can be conducted with all types of functionalized POSS cages and POSS-resins. The key to the process is the utilization of a POSS-cage functionalized with a group that is reactive toward the polymer system of interest. A listing of reactive pairs is shown below in Table 2.

TABLE 2

Selective reactive pairs for grafting of POSS onto polymer chains.

| Polymer System | Polymer Functionality | POSS X-Functionality | Mechanism |
|---|---|---|---|
| Silicone | hydride, olefin, silanol, amine, epoxy | hydride, olefin, silanol, anhydride, amine, epoxy | addition, condensation |
| Polystyrene | anhydride, olefin, alcohol | amine, alcohol, isocyanate | addition, condensation |
| Polyolefin (PP, PE, etc.) | anhydride, olefin, alcohol | amine, alcohol, isocyanate, olefin | addition, condensation, insertion |
| Polyesters | anhydride, alcohol, ester | amine, alcohol, ester | addition, condensation, insertion |
| Polyamides | alcohol, amine, acids | amine, alcohol, isocyanate, acids, epoxies | addition, condensation, insertion |
| Polycarbonates | alcohol, carbonate | amine, alcohol, epoxies | addition, condensation, insertion |
| Acrylics | olefins, esters | olefins, alcohols | addition, condensation, insertion |

Method of Alloying

Once POSS entities are incorporated onto the polymer chain, the resulting POSS-copolymers exhibit a high degree of compatibility toward alloying with nonreactive POSS systems. POSS Molecular Silicas corresponding to the formula $[(RSiO_{1.5})_m]_{\Sigma\#}$ are particularly desired for such alloying as the compatibilizing R group on each cage can be utilized to control the resulting polymer morphology (Scheme 6).

Scheme 6

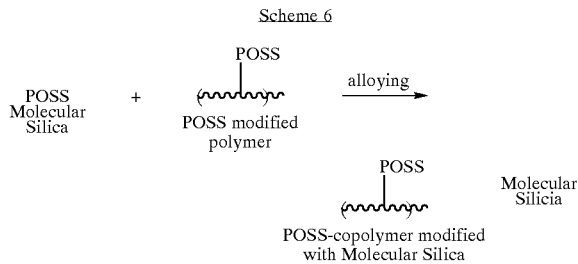

The incorporation of POSS/POS into polymer formulations via alloying can be accomplished through conventional blending and mixing techniques including high and low shear mixing, milling, solvent and supercritical fluid assisted blending as well as through conventional polymerization techniques.

The degree of enhancement of physical properties is dependant upon the loading level of the POSS/POS component incorporated, the size of the silicon-oxygen cage, the size of the nanostructure (R-group effects), the degree of incorporation, and the interfacial compatibility between the nanoreinforcement and the polymer.

POSS/POS-copolymers can be used both as a stand alone replacements or as additives to existing polymer formulations. POSS incorporation as an additive into existing polymer systems has been shown to effect significant improvements in mechanical and physical properties.

EXAMPLES

Alloying performance polymers with POSS Molecular Silicas. Prior to mixing, all Molecular Silicas™ and polymers should be predried at 60° C. to 100° C. under vacuum for three hours or via a similarly effective procedure to ensure removal of traces of water or other volatiles. For continuous extrusion processes it is recommended that the reactive POSS Monomers and POSS Molecular Silicas are introduced using a weight loss feeder at the desired wt % into the mixing vessel of a shear mixer containing the desired formulation components. The mixing residence time can be varied from 1 min to 60 min. Twin screw compounding is the preferred method of incorporation.

Solvent Assisted Application Method for Formulation. POSS-Reagents and POSS Molecular Silicas are added to a vessel containing the desired polymer, prepolymer or monomers and dissolved in a sufficient amount of an organic solvent (e.g. hexane, toluene, dichlormethane etc.) to effect the formation of one homogeneous phase. The mixture is then stirred under high shear at room temperature and the volatile solvent is then removed and recovered under vacuum or using a similar type of process including distillation. Note that supercritical fluids such as $CO_2$ can also be utilized as a replacement for the flammable hydrocarbon solvents. The resulting formulation may then be used directly or stage-reacted for subsequent processing.

As evidence of the generality of the method described, a number of polymeric systems have been modified with POSS reinforcement via the reactive grafting technique. In general a wide range of time dependent and volume dependent physical properties can be enhanced.

Specific Examples Include:

Reactive grafting of $[(cyclopentylSiO_{1.5})_7(glycidalSiO_{1.0})_1]_{\Sigma 8}$ and polycarbonate (PC) is performed at 240° C. in the presence of 2 weight percent tetrabutylammonium bromide (TBAB), in a twinscrew extruder POSS reacts with the PC to produce a POSS/PC copolymer (Scheme 7):

Scheme 7

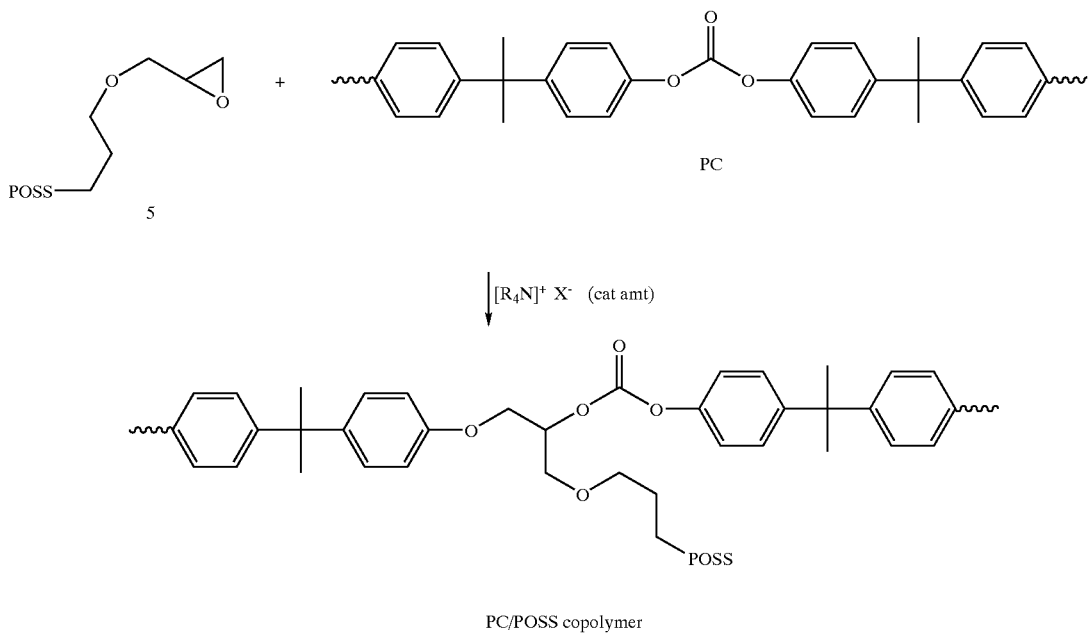

PC/POSS copolymer

Four POSS/PC copolymers were prepared via TBAB-catalyzed reaction of PC with 5–20 wt % POSS. The total amount of POSS incorporated into each copolymer was determined by $^1$H NMR spectroscopy as outlined above; the results are summarized in FIG. 1. The total amount of POSS incorporated into the copolymer increases from 0.35 to 0.8 wt % as the weight-percent of POSS in the feed increases from 0 to 15 wt %. The relationship appears to be linear with a conversion efficiency (upper curve) of approximately 7% when the amount of POSS in the feed is 0 to 10 wt %. When the amount of POSS in the feed exceeds 10 wt %, the conversion efficiency drops rapidly (upper curve). In fact, the efficiency is so poor with 20 wt % POSS in the feed that the amount of POSS incorporated into the copolymer appears to be less than that achieved using a feed with 5 wt % POSS. It is possible that copolymers containing a high percentage of POSS have some solubility in hexane and that the conversion efficiency is somewhat higher that reflected by the upper curve in FIG. 1—especially when the amount of POSS in the feed exceeds 10 wt %. However, the amount of copolymer lost during selective precipitation was minimal, and the conclusion from FIG. 1 is clear: The efficiency for incorporation of POSS into the copolymer is relatively constant when the amount of POSS in the feed is low (0–10 wt %), but it decreases rapidly when the amount of POSS in the feed exceeds 15–20%.

Figure 2:
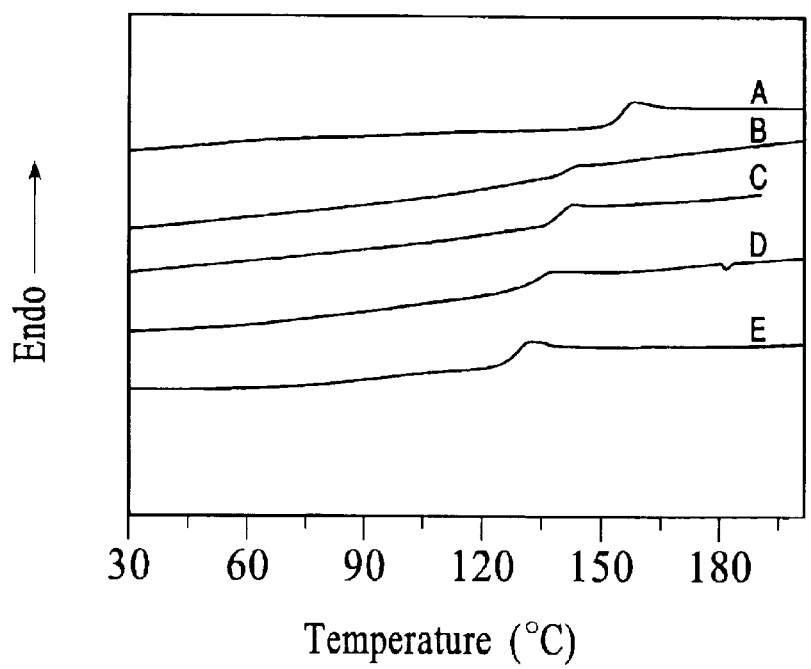
FIG. 2 shows thermal transitions for several POSS/PC copolymers.

DSC thermal transitions for several POSS/PC copolymers prepared by TBAB-catalyzed reactive melt-blending at 240° C. are shown in FIG. 2.

These curves are dramatically different than the DSC curves for blends prepared without TBAB. First, there is no transition observed at 60° C. for crystalline $[(\text{cyclopentylSiO}_{1.5})_7(\text{glycidalSiO}_{1.0})_1]_{\Sigma 8}$. Second, the $T_g$ transition for the PC-rich phase decreases as the wt % of POSS in the sample increases. This trend suggests that the amount of POSS dissolved in the PC-rich domains increases as the amount of POSS increases. Melt-processing with TBAB clearly eliminates crystallinity in the POSS phase and increases the miscibility of POSS in the PC-rich phase.

Figure 3:
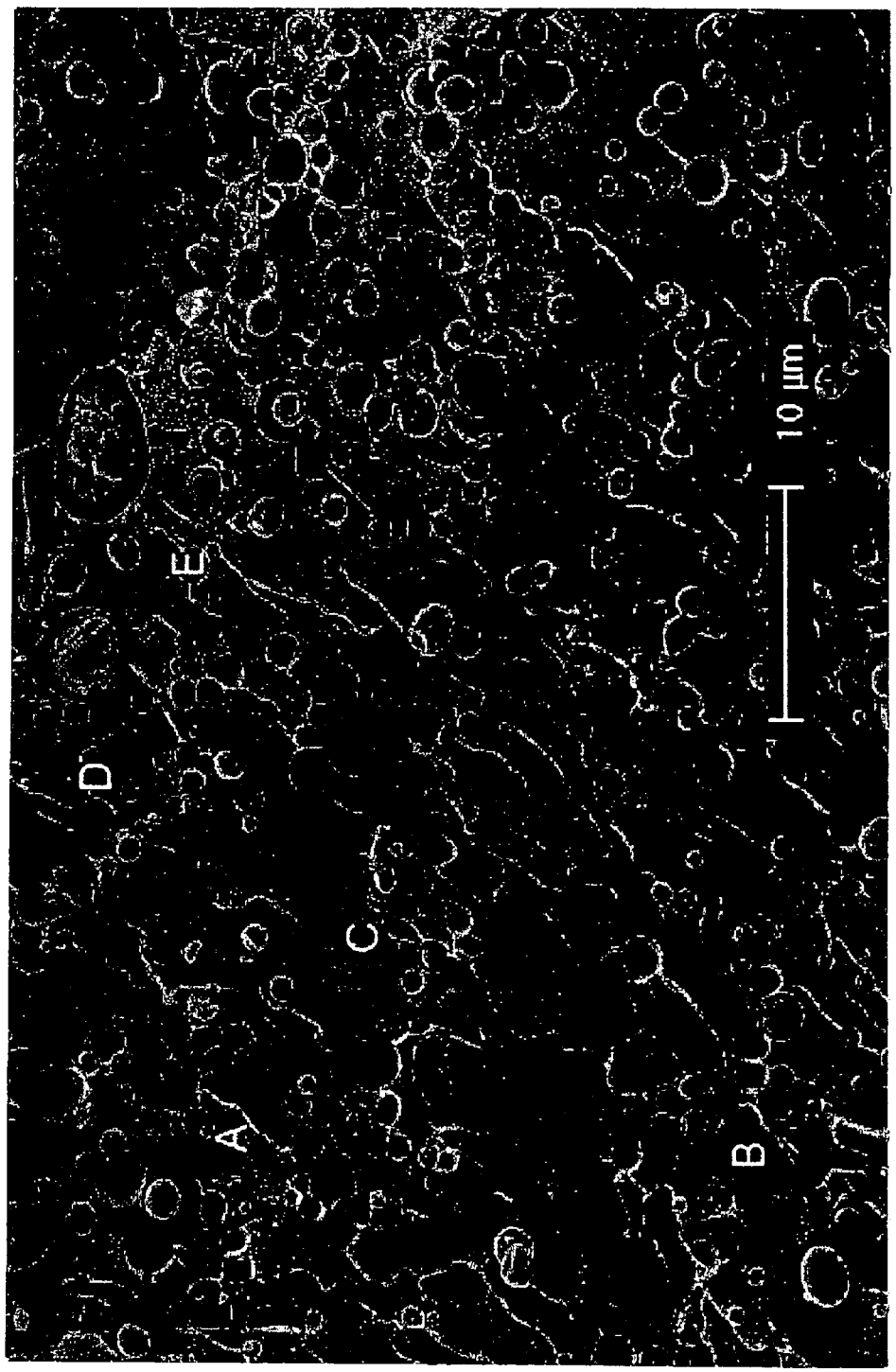
FIG. 3 is a SEM image for a POSS-PC copolymer.

The SEM images shown in FIG. 3 show a morphology for POSS-PC 15%/85% copolymer and alloyed blend, and reveal a number of interesting features in the 50 nm–1000 μm size range. Several conclusions can be drawn from the polymer morphology shown in FIG. 3. In particular, a small fraction of the available POSS reacts with PC; and the remainder was alloyed into the blend. Second, unreacted POSS is not miscible with the PC-rich phase, but it resists crystallization and is intimately alloyed by the POSS-PC copolymer domains and they comprise a large fraction of the surface visible by SEM. As shown in FIG. 3, the surfaces are characterized by large regions of a continuous phase that at higher magnification appear to contain many spherical domains with dimensions ranging from approximately 20–40 nm. The nanometer-scale spherical morphology appears to be predominantly amorphous POSS that is coated with PC/POSS copolymer from the continuous PC-rich phase. Hence the POSS-PC copolymer serves as an alloying agent between the non-POSS containing PC and the non-grafted POSS.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method of alloying polymers comprising:
    (a) reactively grafting a first nanostructured chemical selected from the group consisting of POSS and POS into a polymer selected from the group consisting of silicones, polystyrenes, polyolefins, polyesters, polyamides, polycarbonates, and acrylics, by reacting the first nanostructured chemical to the backbone of the polymer to create a grafted polymer; and
    (b) alloying a second nanostructured chemical selected from the group consisting of nonreactive POSS and POS into the grafted polymer by non-covalently compounding the second nanostructured chemical into the grafted polymer by nonreactive blending.

2. The method of claim 1, wherein the weight percent of the first nanostructured chemical incorporated into the polymer is from 0.1% to 1.0%.

3. The method of claim 1, wherein the amount of the first nanostructured chemical in the feed is from 0.5% to 10% by weight.

4. The method of claim 1, wherein a physical property of the polymer is improved as a result of grafting the first nanostructured chemical into the polymer and alloying the grafted polymer with the second nanostructured chemical.

5. A method according to claim 4, wherein the physical property comprises a property selected from the group consisting of adhesion to a polymeric surface, adhesion to a composite surface, adhesion to a metal surface, water repellency, density, low dielectric constant, thermal conductivity, glass transition, viscosity, molecular motion, melt transition, storage modulus, relaxation, stress transfer, abrasion resistance, fire resistance, biological compatibility, gas permeability, porosity, and optical quality.

* * * * *